US008308038B2

(12) United States Patent
Tanaka et al.

(10) Patent No.: US 8,308,038 B2
(45) Date of Patent: Nov. 13, 2012

(54) PART CLAMP AND NAILING MACHINE

(75) Inventors: Hiroshi Tanaka, Tokyo (JP); Yasushi Yokochi, Tokyo (JP); Satoshi Osuga, Tokyo (JP); Hiroshi Shiokawa, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 13/477,141

(22) Filed: May 22, 2012

(65) Prior Publication Data

US 2012/0228438 A1 Sep. 13, 2012

Related U.S. Application Data

(63) Continuation of application No. 10/588,517, filed as application No. PCT/JP2005/001590 on Feb. 3, 2005, now abandoned.

(30) Foreign Application Priority Data

Feb. 6, 2004 (JP) .............................. P.2004-031025
Aug. 10, 2004 (JP) .............................. P.2004-233793

(51) Int. Cl.
*F16L 3/00* (2006.01)
*B25C 7/00* (2006.01)

(52) U.S. Cl. ............ 227/119; 227/18; 29/453; 411/439; 403/353

(58) Field of Classification Search .............. 227/8, 119, 227/120, 130, 15, 142, 18; 403/294, 353; 29/453, 428; 411/439, 440
See application file for complete search history.

(56) References Cited

U.S. PATENT DOCUMENTS

| | | | |
|---|---|---|---|
| 3,091,795 | A | 6/1963 | Budwig |
| 3,638,892 | A | 2/1972 | Boye |
| 4,214,723 | A | 7/1980 | Voorhees |
| 4,227,637 | A | 10/1980 | Haytayan |
| 4,291,855 | A | 9/1981 | Schenkel et al. |
| 4,339,065 | A | 7/1982 | Haytayan |
| 4,434,927 | A | 3/1984 | Butler |
| 5,484,094 | A | 1/1996 | Gupta |
| 5,649,660 | A | 7/1997 | Akiba |
| 5,649,661 | A | 7/1997 | Masuno |
| 6,145,723 | A | 11/2000 | Gupta |

(Continued)

FOREIGN PATENT DOCUMENTS

CN 1106723 A 8/1995

(Continued)

*Primary Examiner* — Scott A. Smith
(74) *Attorney, Agent, or Firm* — Morgan, Lewis & Bockius LLP

(57) ABSTRACT

A part clamp is temporarily held in a short cylindrical portion provided on a contact arm of a nailing machine and is nailed to a building body or the like by the nailing machine. The part clamp is provided with a base portion having a through hole at its center for inserting a nail therethrough, and an engaging portions for engaging with the short cylindrical portion. When the part clamp is pushed in the axial direction of an injection port of the nailing machine, the part clamp is temporarily held in the short cylindrical portion. The load to push the part clamp to engage with the short cylindrical portion is lower than the load to push the contact arm to slide along the injection port.

1 Claim, 24 Drawing Sheets

U.S. PATENT DOCUMENTS

| | | | |
|---|---|---|---|
| 6,145,725 | A | 11/2000 | Omli |
| 6,371,350 | B2 | 4/2002 | Gonnet |
| 6,454,151 | B1 | 9/2002 | Wang-Kuan |
| 6,578,750 | B2 | 6/2003 | Kubo |
| 6,708,821 | B2 | 3/2004 | Tucker |
| 6,820,789 | B2 | 11/2004 | Lipsky |
| 6,908,022 | B2 | 6/2005 | Schmitz |
| 7,255,256 | B2 | 8/2007 | McGee |
| 7,452,315 | B2 | 11/2008 | Hata |
| 7,513,404 | B2 | 4/2009 | Shkolnikov |
| 2001/0008040 | A1 | 7/2001 | Gonnet |
| 2003/0041696 | A1 | 3/2003 | Lipsky |

FOREIGN PATENT DOCUMENTS

| | | | |
|---|---|---|---|
| DE | 22900491 | U1 | 1/1999 |
| EP | 1051573 | B1 | 8/2003 |
| FR | 2350493 | | 12/1977 |
| FR | 2786541 | | 6/2000 |
| JP | 5222280 | | 8/1950 |
| JP | 6185375 | | 6/1986 |
| JP | 6350679 | | 4/1988 |
| JP | 641871 | | 1/1989 |
| JP | 200464612 | | 6/1992 |
| JP | 925692 | | 1/1997 |
| JP | 2000006049 | | 1/2000 |

PART CLAMP AND NAILING MACHINE

This application is a continuation application of application Ser. No. 10/588,517, filed on Nov. 17, 2008 now abandoned, which claims the benefit of international application PCT/JP2005/001590 filed on Feb. 3, 2005, both of which are hereby incorporated by reference.

TECHNICAL FIELD

The present invention relates to a part clamp, such as a clip for piping, which is fixed on a wall face of a frame of a building or the like by a nailing machine, and the nailing machine for nailing the part clamp.

BACKGROUND ART

Disclosed in U.S. Pat. No. 4,291,855 is a plurality of part clamps for fixing a pipe. When a wall face or the like of a frame of a structure or a building is to be piped, the part clamp is nailed in advance on the wall face so that the pipe is fixed by the part clamp. When the worker fixes the part clamps in the wall face or the like during the nailing operations of the part clamp, the worker holds the part clamp stably on the wall face with the part clamp being held in a single hand and applies a leading end of the nailing machine with the other hand to strike a nail into a center position of the clip.

Since the part clamp cannot be fixed in this case without the two hands, the worker feels seriously inconvenient without any free-hand operation.

Therefore, disclosed in U.S. Pat. No. 6,371,350 is a means for improving the inconvenience. The part clamp of U.S. Pat. No. 6,371,350 includes a temporary holding mechanism for engaging with a leading end of a cylindrical injection port of a nailing machine to fix it lightly so that a nail is driven with the part clamp being temporarily held, thereby to fix the part clamp in the wall face of the frame or the like. In this case, the one-hand operation is set free to facilitate the work.

In the constitution of U.S. Pat. No. 6,371,350, however, the part clamp has to be transversely slid with respect to the leading end of the injection port of the nailing machine so as to hold the part clamp temporarily. This raises a problem in that the temporarily holding work itself is troublesome.

DISCLOSURE OF THE INVENTION

The present invention has been conceived to solve the problem, and provides a part clamp and a nailing machine, which are enabled to hold the part clamp in the nailing machine simply and safely by moving the part clamp in an axial direction of an injection port of the nailing machine.

A part clamp of an embodiment of the invention is fixed by a nailing machine and is provided with: a base portion having a through hole at its center for inserting a nail thereinto; rising portions rising from the two sides of the base portion; and engaging portions formed on the inner sides of the rising portions on the two sides for engaging with the leading end of the nailing machine.

Here, the engaging portions may be formed in an elastically deformable lip shape, into rod-shaped members protruding vertically from the base portion, into protrusions formed on the inner sides of the rising portions on the two sides and protruding vertically from the base portion to confront each other, or in a lip shape having their inner edge portions formed in a noncircular shape.

It is preferred that sloped guide faces are formed on the inner wall faces of the rising portions on the two sides.

Moreover, a part clamp of an embodiment of the invention is fixed by a nailing machine and is provided with: a base portion having a through hole for inserting a nail thereinto; and engaging portions formed around the base portion and made engageable with the leading end of the nailing machine when it moves toward an opposite side of a nail driving direction.

Further, in a nailing machine of an embodiment of the invention, apart clamp is temporarily held in a short cylindrical portion of a contact arm arranged at the leading end of an injection port of the nailing machine and is nailed on the surface of the fitting portion of a building body or the like by the nailing operation of the nailing machine. The part clamp includes a base portion having a through hole for inserting a nail thereinto, and engaging portions made to engage with the short cylindrical portion by pushing the part clamp in the axial direction of the injection port. Moreover, a load to push the engaging portions into engagement with the short cylindrical portion is lower than the load necessary for pushing the short cylindrical portion into the base portion side of the injection port.

Here, it is preferred that an annular protrusion may be formed at the outer circumference of the short cylindrical portion, and that the engaging portions are formed into such a lip portion as can elastically engage with the annular protrusion.

Groove portions parallel to the axial direction of the injection port may be formed on the opposite sides of the circumference of the short cylindrical portion, and the engaging portions maybe formed into such a rod shape protruding vertically from the two sides of the base portion as can be fitted in the groove portions.

Moreover, an annular groove portion may be formed in the circumference of the short cylindrical portion, and the engaging portions may protrude vertically from the two sides of the base portion and may elastically engage with the annular groove portion.

Moreover, the short cylindrical portion may have a noncircular contour, and the engaging portions may allow the short cylindrical portion to move to the base portion by pushing the part clamp to move in the axial direction of the injection port so that the short cylindrical portion may engage, when turned, with the short cylindrical portion.

BRIEF DESCRIPTION OF THE DRAWINGS

[FIG. 13(*b*)] An explanatory top plan view of the pushed state of the part clamp.

[FIG. 14(*b*)] An explanatory top plan view of the turned state of the part clamp.

DESCRIPTION OF REFERENCE NUMERALS AND SIGNS

Figure 1:
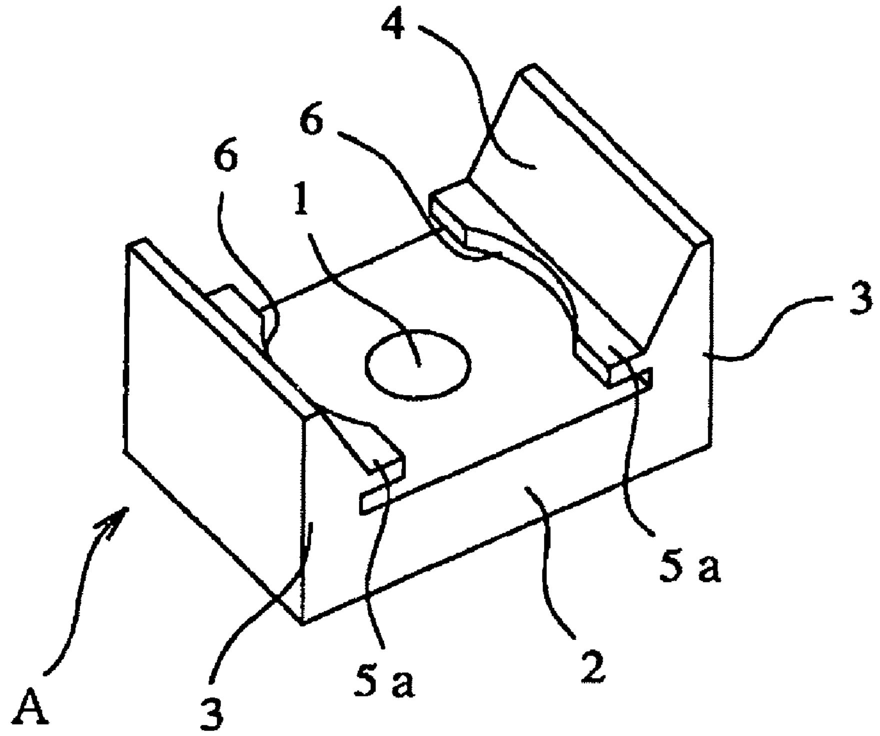
[FIG. 1] A perspective view of a part clamp according to the invention.

In the reference numerals and signs of the drawings : letters A, A', B, B', C, C', D, E and F designate part clamps; numeral 1 a through hole; numeral 2 a base portion; numeral 3 rising portions; numerals 5*a*, 5*b*, 5*c*, 5*d*, 5*e* and 5*f* engaging portions; numeral 9 an injection port; numeral 11 a contact arm; and numeral 12 a short cylinder portion.

BEST MODE FOR CARRYING OUT THE INVENTION

Embodiments of the invention will be described with reference to the accompanying drawings.

<Embodiment 1>

FIG. 1 shows a part clamp A of Embodiment 1 of the invention. The part clamp A constitutes a clamp for fixing parts, for example, a clip to fix a wiring line. The part clamp is nailed by a nailing machine on a surface of a fitting portion such as a floor face or a wall face of a structure or a building.

The part clamp A is usually made of a synthetic resin, and is provided with a base portion 2 having a through hole 1 at its center to insert a nail thereinto, and rising portions 3 rising from two sides of the base portion 2. On inner wall faces of the rising portions 3 of the two sides, there are formed inclined guide faces 4 having base portions, on the inner sides of which engaging portions 5*a* to engage with a leading end of the nailing machine are formed. The engaging portions 5*a* are formed in an elastically deformable lip shape, which has its inner edge portion 6 formed in an arcuate shape.

The rising portions 3 are scheduled to have functional portions such as the clips made integral or formed integrally with their leading ends.

Before the part clamp A is nailed on the surface of the fitting portion of a building body or the like, the part clamp A is temporarily fixed on the nailing machine.

Figure 2:
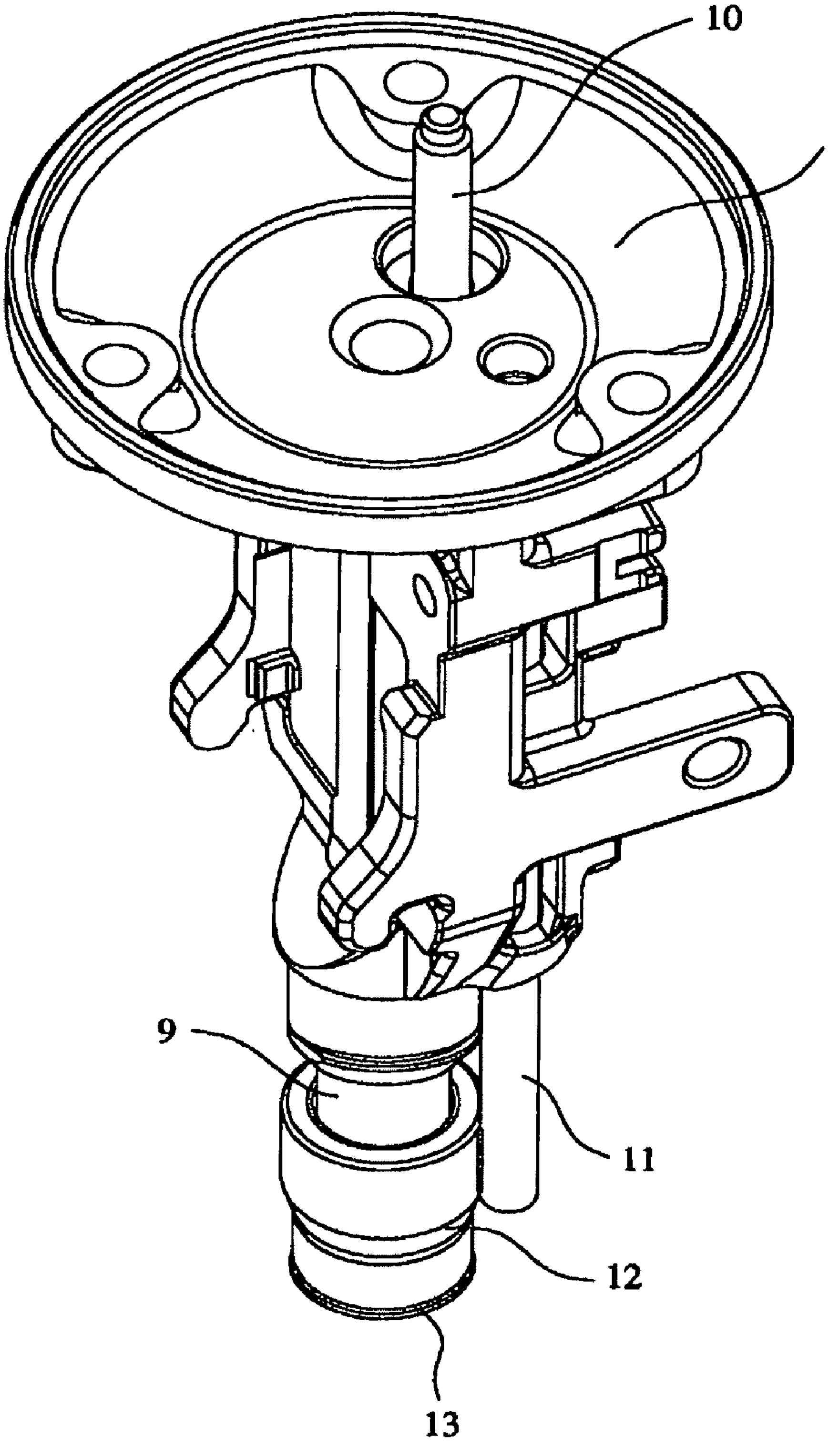
[FIG. 2] A perspective view of an essential portion of a nailing machine according to the invention.

In FIG. 2, numeral 8 designates a bottom portion of a body of the nailing machine and has an injection port 9 formed at the leading end of the body. In the injection port 9, there is slidably disposed a driver 10, which is driven by an impacting mechanism in the body. At the side portion of the injection port 9, there is arranged as a safety device a contact arm 11 which can move (slide) along the injection port 9. A short cylindrical portion 12 (a contact top) is formed at the leading end of the contact arm 11. This short cylindrical portion 12 is arranged such that it can slide in an axial direction of the injection port 9 simultaneously when the contact arm 11 slides. The short cylindrical portion 12 at the leading end of the contact arm 11 is usually protruded forward from the leading end of the injection port 9. When the short cylindrical portion 12 is pushed for the nailing operation onto the surface of a fitting portion 14 such as the building body, the contact arm 11 is pushed relative to the injection port 9 so that the safety device is released. When the safety device is released, the nailing operation of the driver 10 can be performed.

The part clamp A is temporarily held on the short cylindrical portion 12. Next, a temporary holding mechanism of the part clamp A is described.

Figure 3:
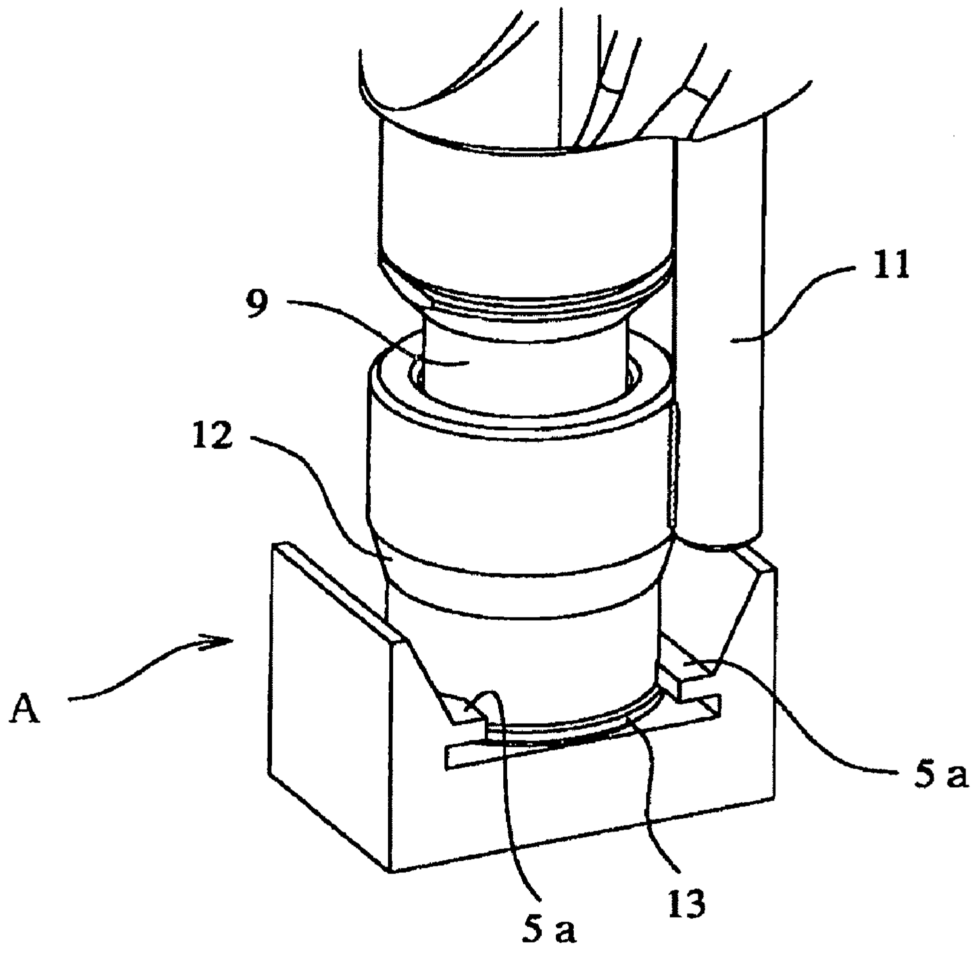
[FIG. 3] A perspective view of a temporary held state of the part clamp.
Figure 4:
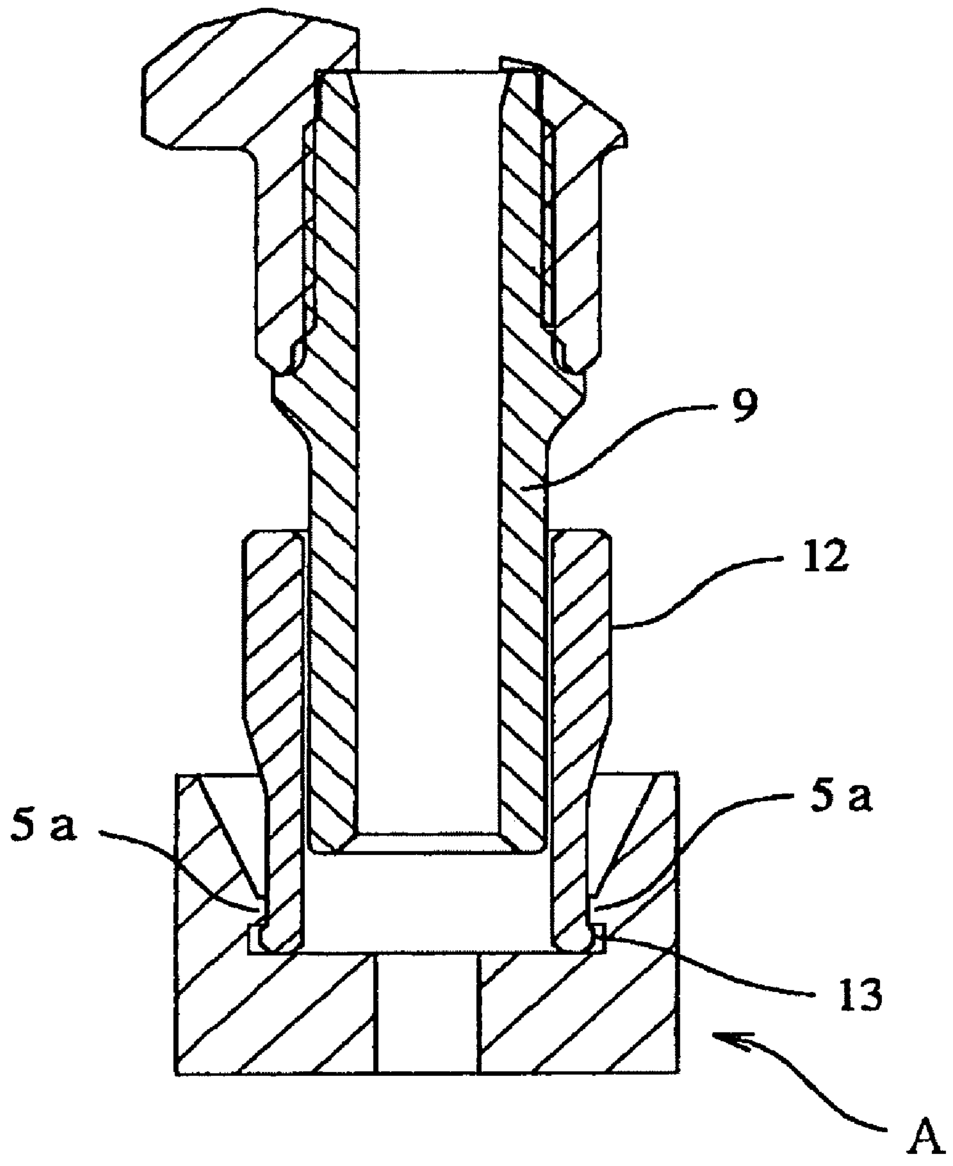
[FIG. 4] A longitudinal section of the temporary held state of the part clamp.

An annular protrusion 13 is formed at the outer circumference of the leading end portion of the short cylindrical portion 12. The annular protrusion 13 is formed to taper toward its leading end. The engaging portions 5*a* of the part clamp A are formed such that they can elastically engage with the annular protrusion 13. Specifically, the part clamp A is brought close to the short cylindrical portion 12, and this short cylindrical portion 12 is moved along the guide faces 4. As shown in FIG. 3 and FIG. 4, the engaging portions 5*a* are moved axially of the injection port 9 to push the short cylindrical portion 12 into engagement.

In order that the engaging portions 5 may thus be pushed into engagement with the short cylindrical portion 12, a predetermined load is required. At the same time, this load also acts to push the short cylindrical portion 12. However, the load to push the engaging portions 5 onto the short cylindrical portion 12 is set lower than the load necessary for pushing the short cylindrical portion 12 onto the root portion side of the injection port 9. In other words, the load to push the part clamp A into engagement with the short cylindrical portion 12 is lower than that for pushing the contact arm 11 to slide along the injection port 9.

As a result, the short cylindrical portion 12 is not pushed when the part clamp A is brought into engagement with the short cylindrical portion 12, so that the safety device is not released. Moreover, the part clamp A can be moved axially of the injection port 9 and can also be mounted by a low load. Therefore, the part clamp A can be temporarily held simply and safely.

Figure 5:
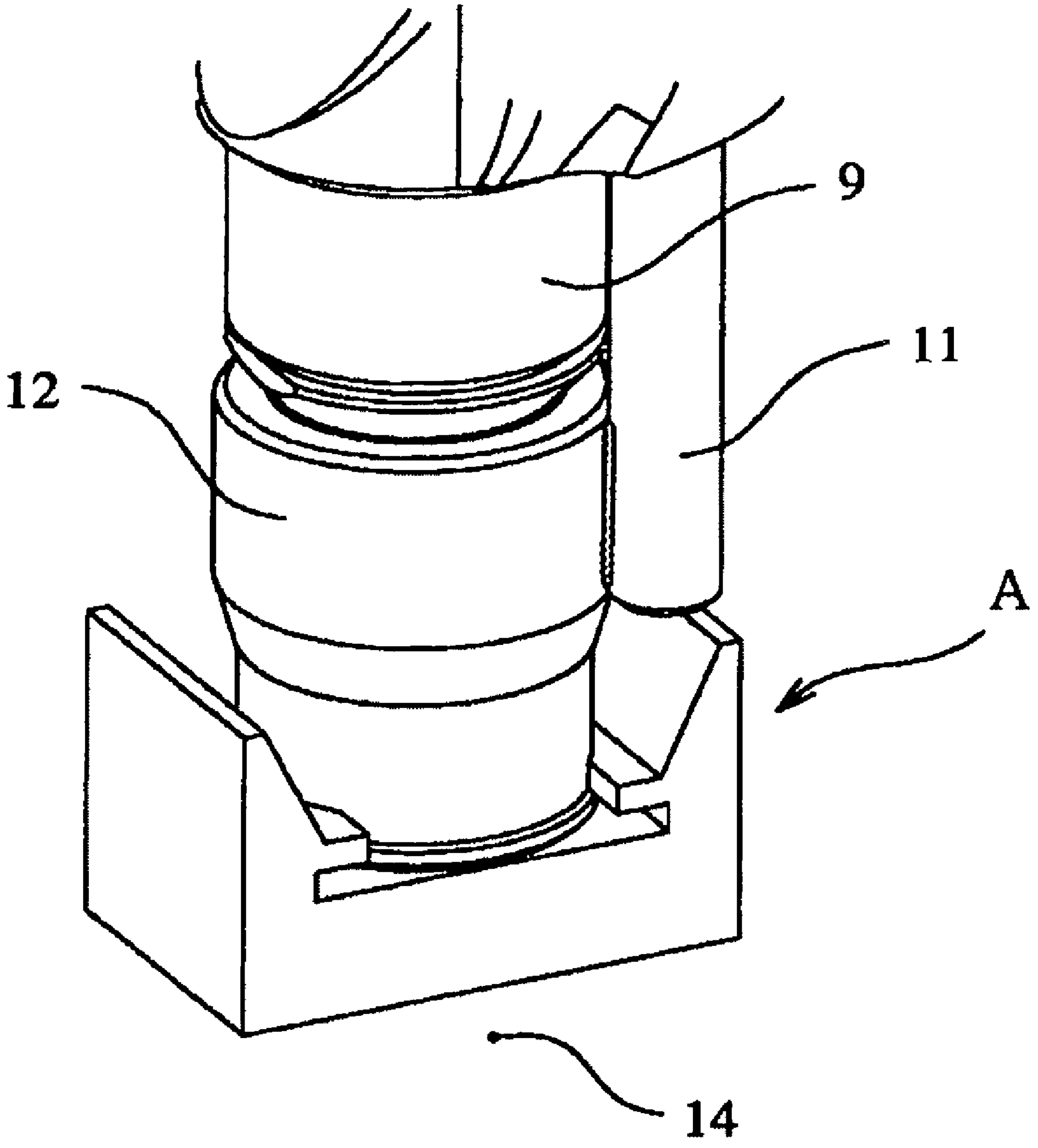
[FIG. 5] A perspective view of the state, in which the part clamp is pushed onto a fitting portion.
Figure 6:
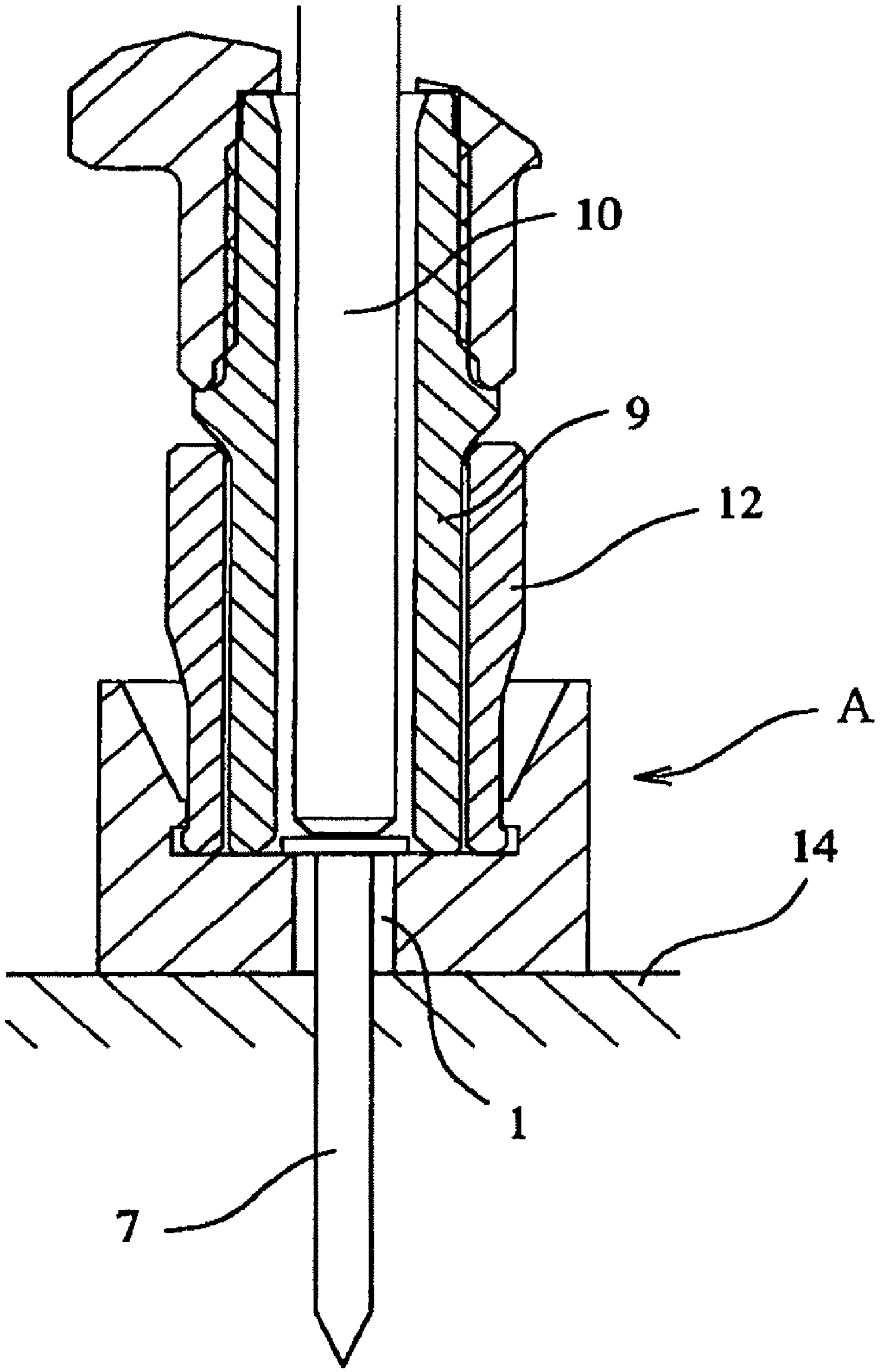
[FIG. 6] A perspective view of the state, in which the part clamp is nailed.

When the part clamp A is to be fixed on the fitting portion 14 of the building or the like, the part clamp A temporarily held is applied to a predetermined position of the fitting portion 14, as shown in FIG. 5 and FIG. 6. After this, the injection port 9 is pushed to move the contact arm 11 to the opposite side of the injection port 9 to release the safety device, and a punching operation is performed. The nail punched is driven through the inside of the injection port 9 and through the through hole 1 of the part clamp A into the fitting portion 14 of the building body or the like thereby to fix the part clamp A with the nail.

Here, the sloped guide faces 4 need not always be formed on the inner wall faces of the two rising portions 3 of the part clamp A. This unnecessariness likewise applies to the subsequent examples (or Embodiments 2 to 6).

Figure 20:
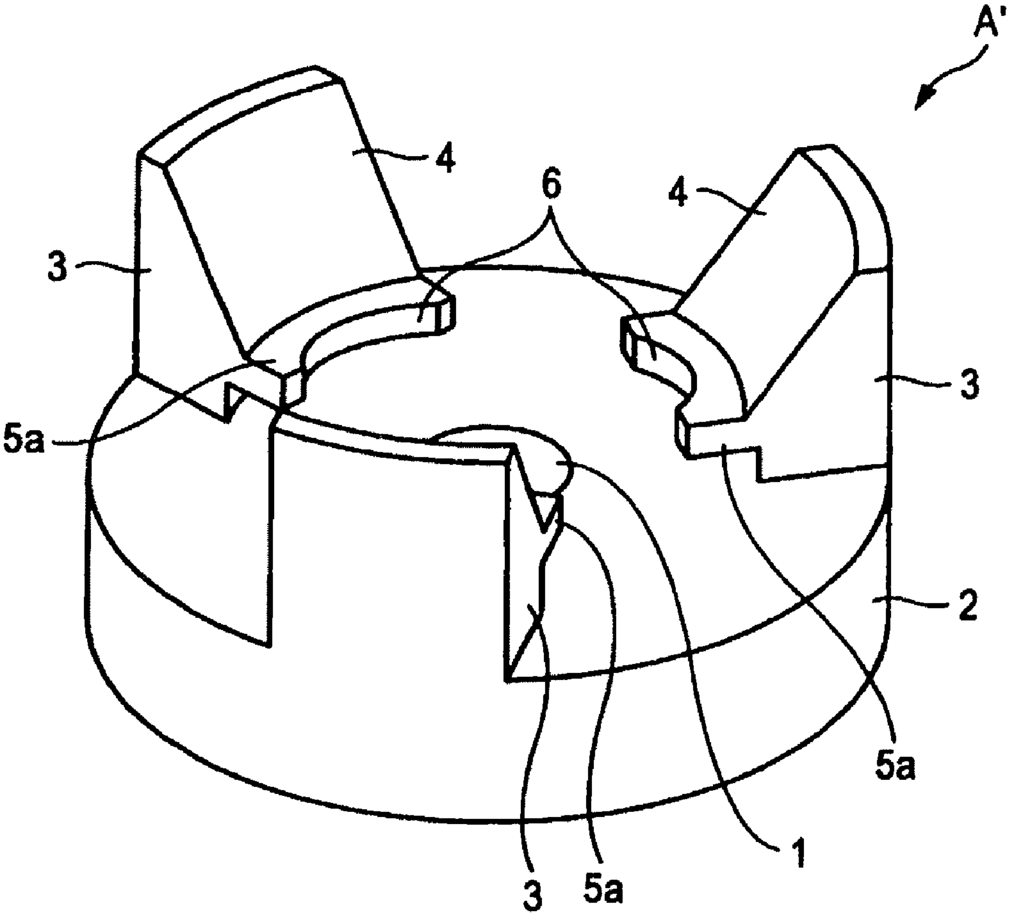
[FIG. 20] A perspective view of a further embodiment of the part clamp.

Here, the part clamp A of FIG. 1 is equipped with the paired rising portions 3 on the base portion 2, as described hereinbefore. In a part clamp A' shown in FIG. 20, however, three or more rising portions 3 can also be formed on the base portion 2. Excepting the number of the rising portions 3, the constitution of the part clamp A' is similar to that of the part clamp A, and each rising portion 3 has the engaging portion 5*a* and the guide face 4.

<Embodiment 2>

Figure 7:
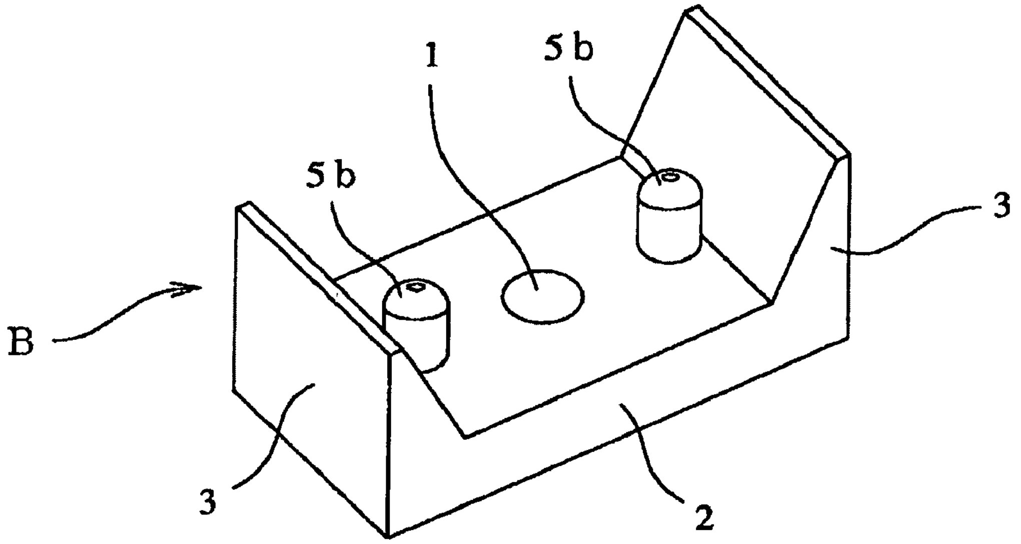
[FIG. 7] A perspective view of another embodiment of the part clamp.

FIG. 7 shows a part clamp of Embodiment 2 of the invention. The part clamp B includes the base portion 2 and the rising portions 3, and the rising portions 3 on the two sides have rod-shaped engaging portions 5*b* formed on their inner sides to protrude vertically of the base portion 2. The engaging portions 5*b* are formed to have round leading ends.

Figure 8:
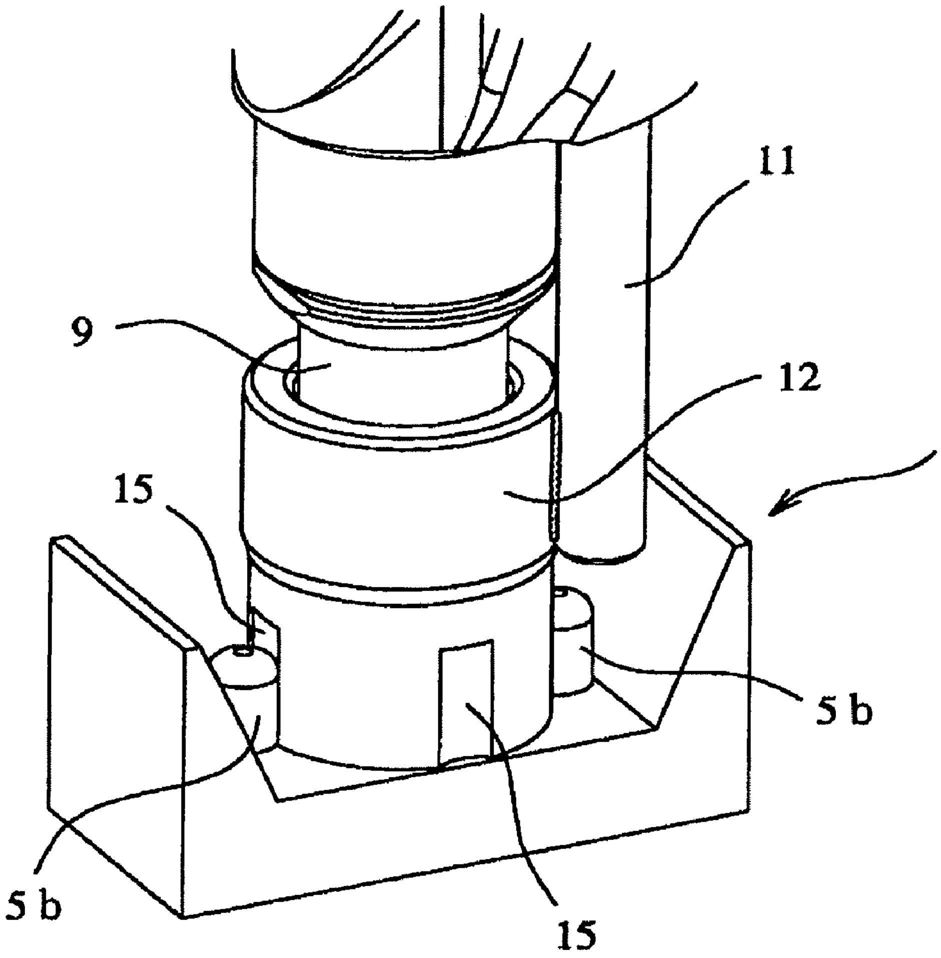
[FIG. 8] A perspective view of the temporary held state of the part clamp.

On the contrary, as shown in FIG. 8, groove portions 15 axially in parallel are formed in the opposite sides of the circumference of the short cylindrical portion 12 of the nailing machine. In the outer circumference of the short cylindrical portion 12, specifically, there are formed the paired groove portions 15 and 15 which are in parallel with the axial direction of the injection port, and one 15 of which is arranged at a position substantially spaced by about 180 degrees along the outer circumference of the short cylindrical portion 12 from the other groove portion 15. These groove portions 15 are formed to correspond to the engaging portions 5*b* of the part clamp B.

When the part clamp B is to be mounted on the short cylindrical portion 12 of the nailing machine, it is brought close to the short cylindrical portion 12, and its engaging portions 5*b* are moved in the axial direction of the injection port 9 and pushed and rather tightly fitted in the groove portions 15 of the short cylindrical portion 12.

In this case, too, the load to push the engaging portions 5*b* into engagement with the short cylindrical portion 12 is set lower than the load necessary for pushing the short cylindrical portion 12 onto the root portion side of the injection port 9. In other words, the load to push the part clamp B into engagement with the short cylindrical portion 12 is lower than that for pushing the contact arm 11 to slide along the injection port 9.

As a result, the short cylindrical portion 12 is not pushed when the part clamp B is brought into engagement with the short cylindrical portion 12, so that the safety device is not released. Moreover, the part clamp B can be moved axially of the injection port 9 and can also be mounted by a low load. Therefore, the part clamp B can be temporarily held simply and safely.

Figure 21:
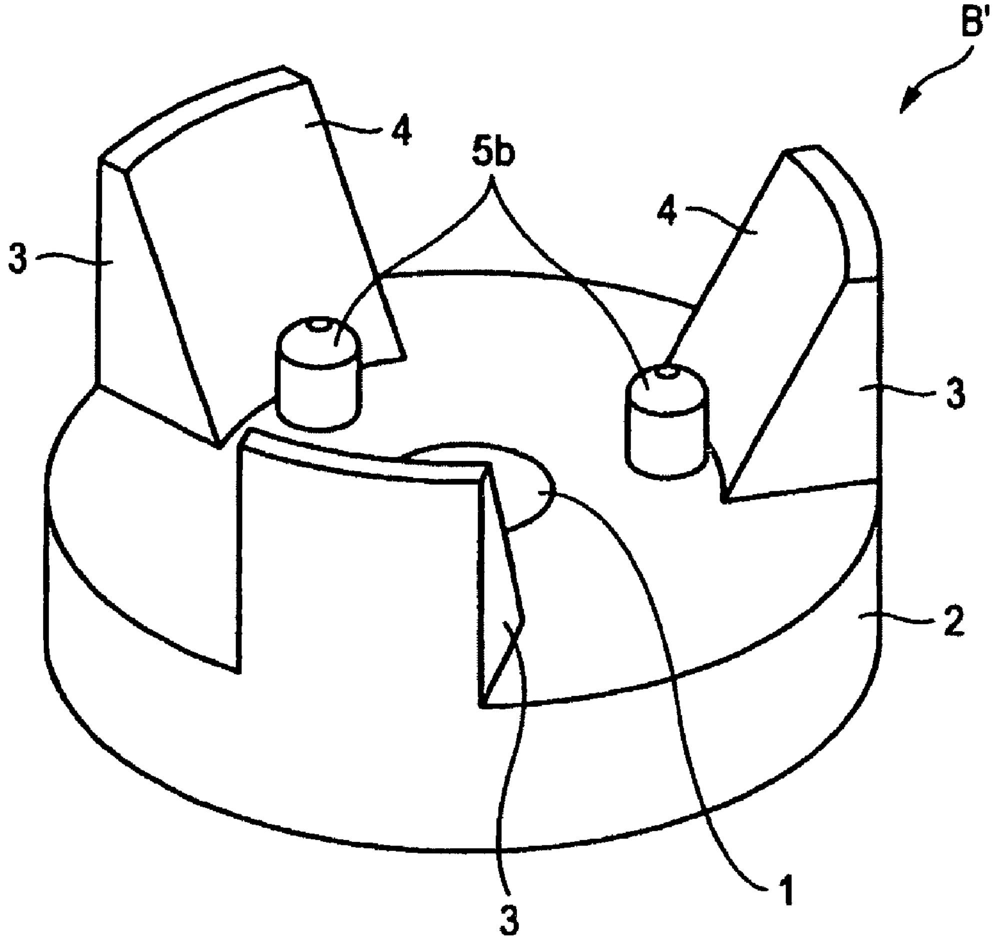
[FIG. 21] A perspective view of a further embodiment of the part clamp.

Here, the part clamp B shown in FIGS. 7 and 8 is equipped with the paired rising portions 3 and the paired engaging portions 5*b* on the base portion 2. In a part clamp B' shown in FIG. 21, however, three or more rising portions 3 and engaging portions 5*b* may also be formed on the base portion 2. Excepting the numbers of the rising portions 3 and the engaging portions 5*b*, the constitution of the part clamp B' are similar to that of the part clamp B.

<Embodiment 3>

Figure 9:
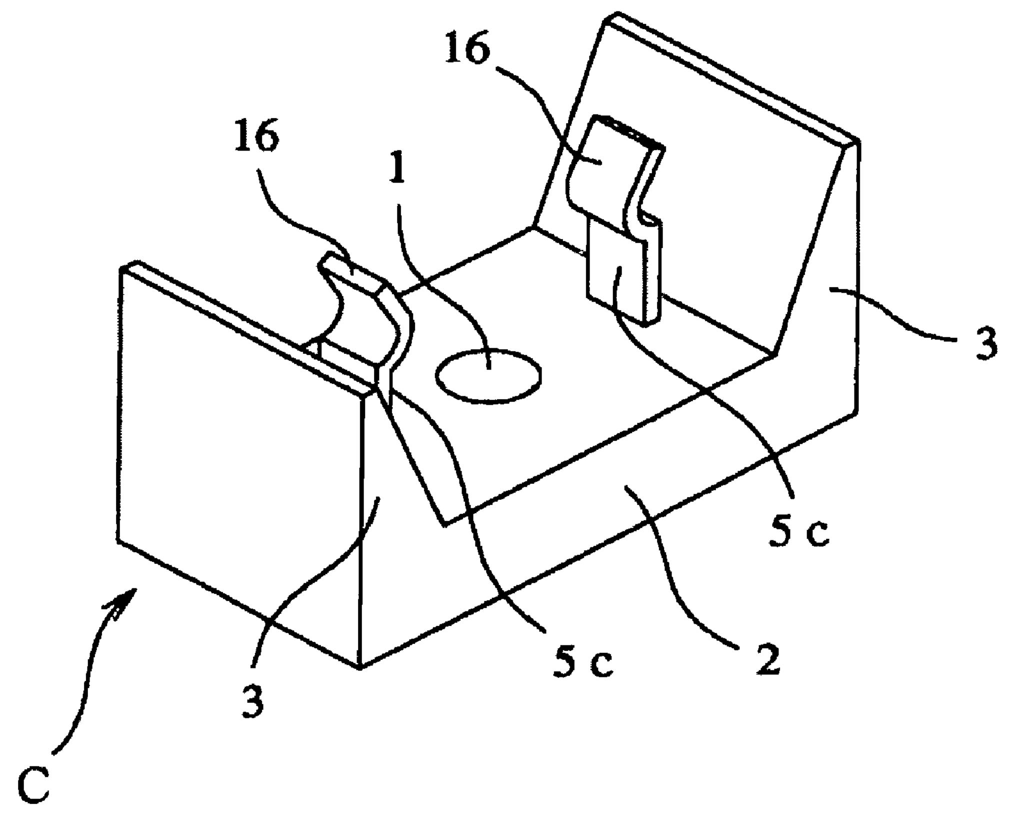
[FIG. 9] A perspective view of another embodiment of the part clamp.

FIG. 9 shows apart clamp C of Embodiment 3 of the invention. The part clamp C includes the base portion 2 and the rising portions 3, and the rising portions 3 on the two sides have engaging portions 5*c* formed on their inner sides to protrude vertically of the base portion 2. The individual engaging portions 5*c* have protrusions 16 formed on their confronting sides. Specifically, the individual protrusions 16 are so formed over the individual engaging portions 5*c* as to protrude toward the through hole 1.

Figure 10:
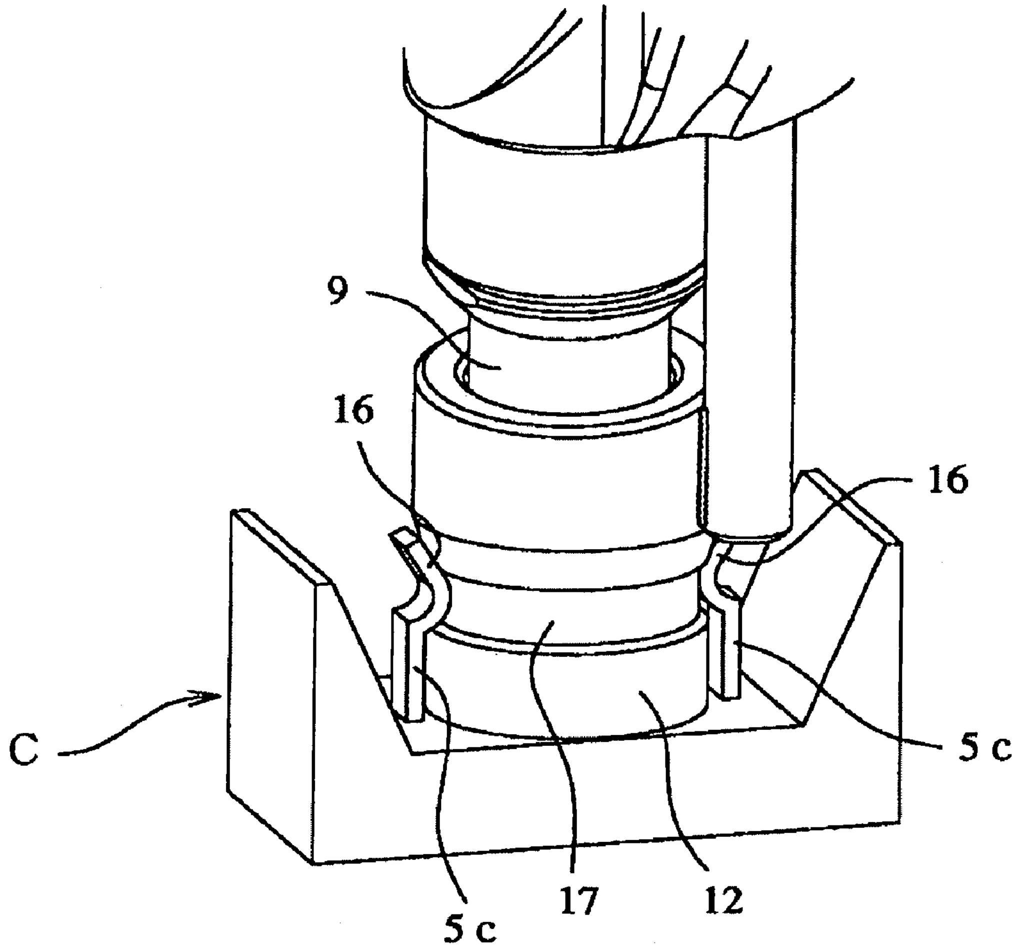
[FIG. 10] A perspective view of the temporary held state of the part clamp.

On the contrary, as shown in FIG. 10, an annular groove portion 17 is formed in the circumference of the short cylindrical portion 12 of the nailing machine. This annular groove portion 17 is formed to correspond to the engaging portions 5*c* of the part clamp.

When the part clamp C is to be mounted on the short cylindrical portion 12 of the nailing machine, it is brought close to the short cylindrical portion 12, and its engaging portions 5*c* are pushed so far from the outer side of the short cylindrical portion 12 that the protrusions 16 of the engaging portions 5*c* may come into elastic engagement with the annular groove portion 17.

In this case, too, the load to push the engaging portions 5*c* into engagement with the short cylindrical portion 12 is set lower than the load necessary for pushing the short cylindrical portion 12 onto the root portion side of the injection port 9. In other words, the load to push the part clamp C into engagement with the short cylindrical portion 12 is lower than that for pushing the contact arm 11 to slide along the injection port 9.

As a result, the short cylindrical portion 12 is not pushed when the part clamp C is brought into engagement with the short cylindrical portion 12, so that the safety device is not released. Moreover, the part clamp C can be moved axially of the injection port 9 and can also be mounted by a low load. Therefore, the part clamp C can be temporarily held simply and safely.

Figure 22:
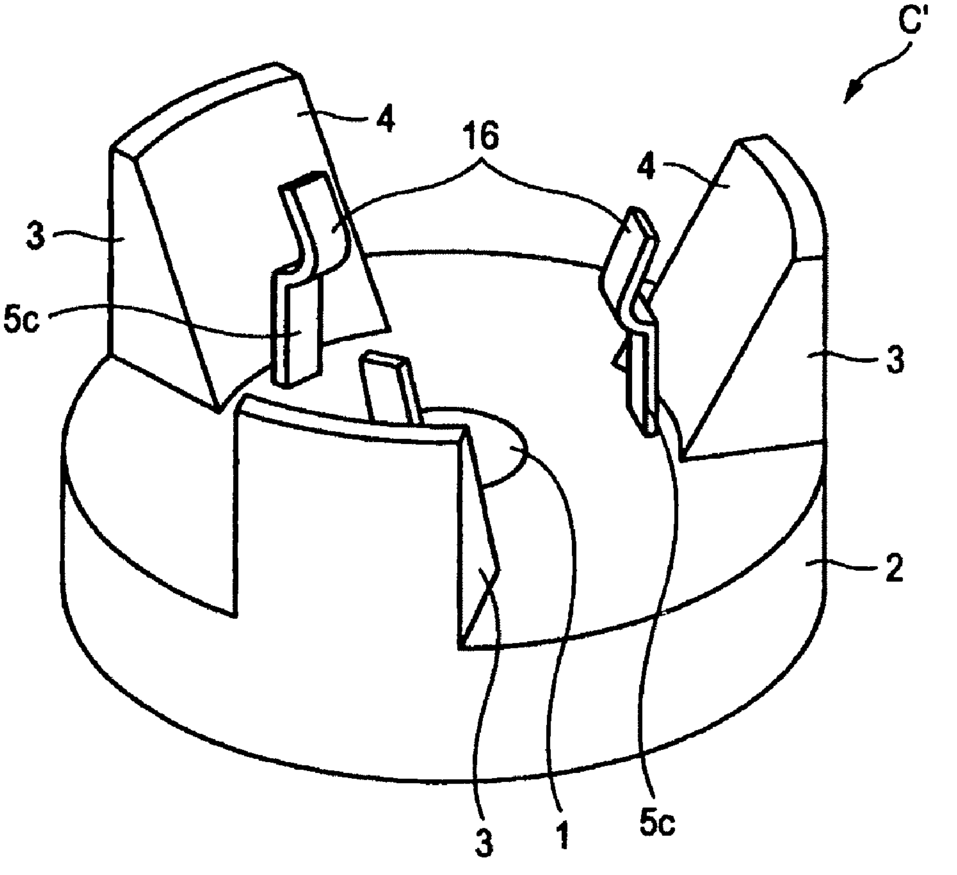
[FIG. 22] A perspective view of a further embodiment of the part clamp.

Here, the part clamp C shown in FIGS. 9 and 10 is equipped with the paired rising portions 3 and the paired engaging portions 5*c* on the base portion 2. In a part clamp C' shown in FIG. 22, however, three or more rising portions 3 and engaging portions 5*c* may also be formed on the base portion 2. Excepting the numbers of the rising portions 3 and the engaging portions 5*c*, the constitution of the part clamp C' are similar to that of the part clamp C so that the individual protrusions 16 are so formed on the individual engaging portions 5*c* as to protrude toward the through hole 1.

<Embodiment 4>

Figure 11:
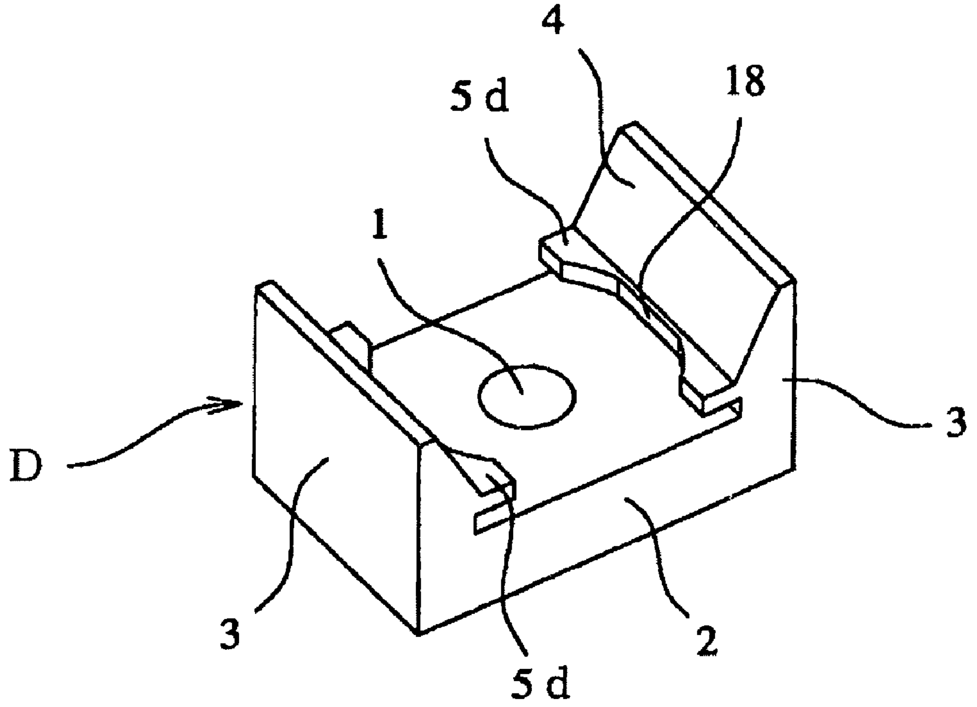
[FIG. 11] A perspective view of still another embodiment of the part clamp.

FIG. 11 shows apart clamp D of Embodiment 4 of the invention. The part clamp D is equipped with the base portion 2 and the rising portions 3, and the rising portions 3 on the two sides have the sloped guide faces 4. Moreover, engaging portions 5*d* are formed on the inner sides of the root portions of the guide faces 4 on the two sides. These engaging portions 5*d* are formed in a lip shape and have inner edge portions 18 notched in a recessed shape.

Figure 12:
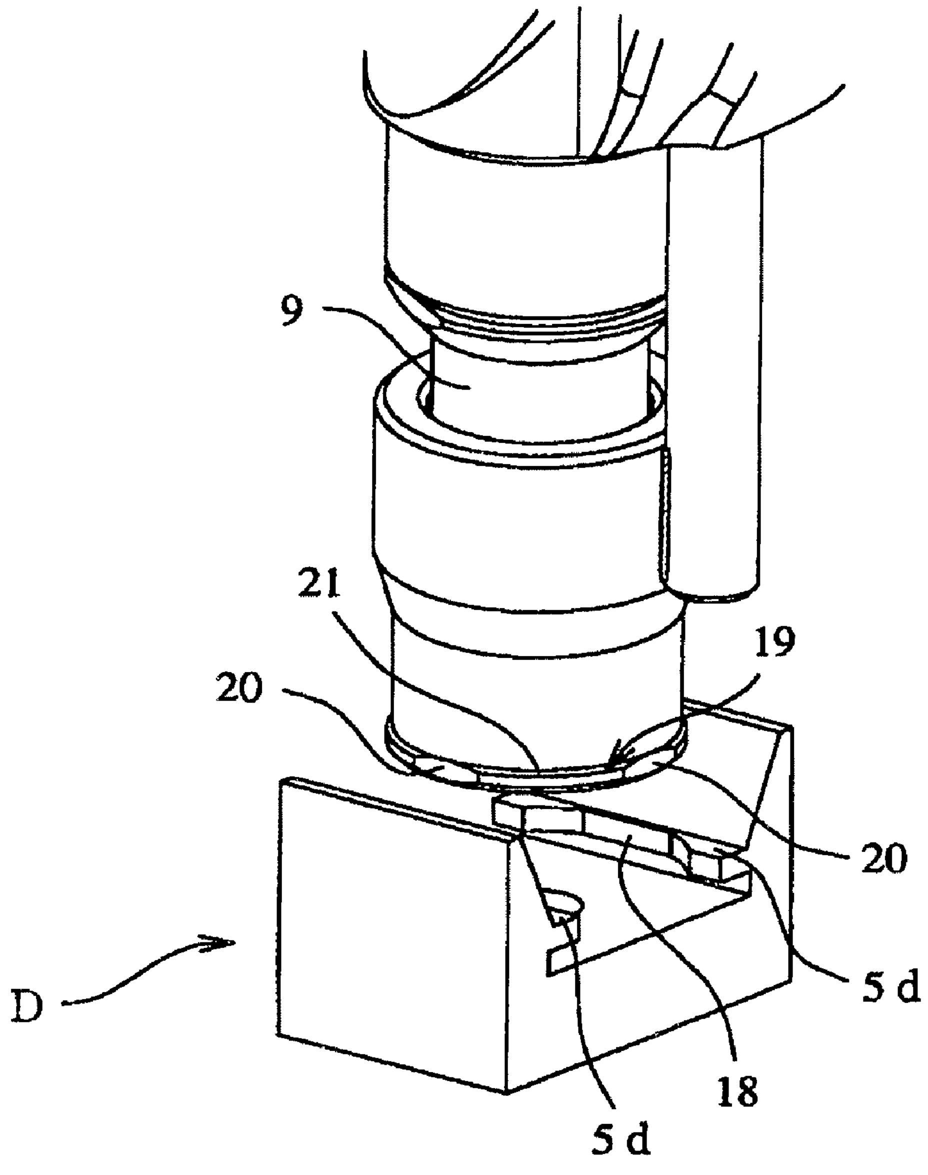
[FIG. 12] A perspective view of the state immediately before the temporary held state of the part clamp.

As shown in FIG. 12, on the other hand, the circumference of the leading end of the short cylindrical portion 12 of the nailing machine has a contour shaped by cutting an annular protrusion 19 cut away at four portions 20 at a predetermined interval. In short, the short cylindrical portion 12 has a non-circular outer circumference. The cut-away portions 20 of the protrusion 19 and arcuate portions 21 on their two sides are formed smaller than the engaging portions 5*d*.

Figure 13A:
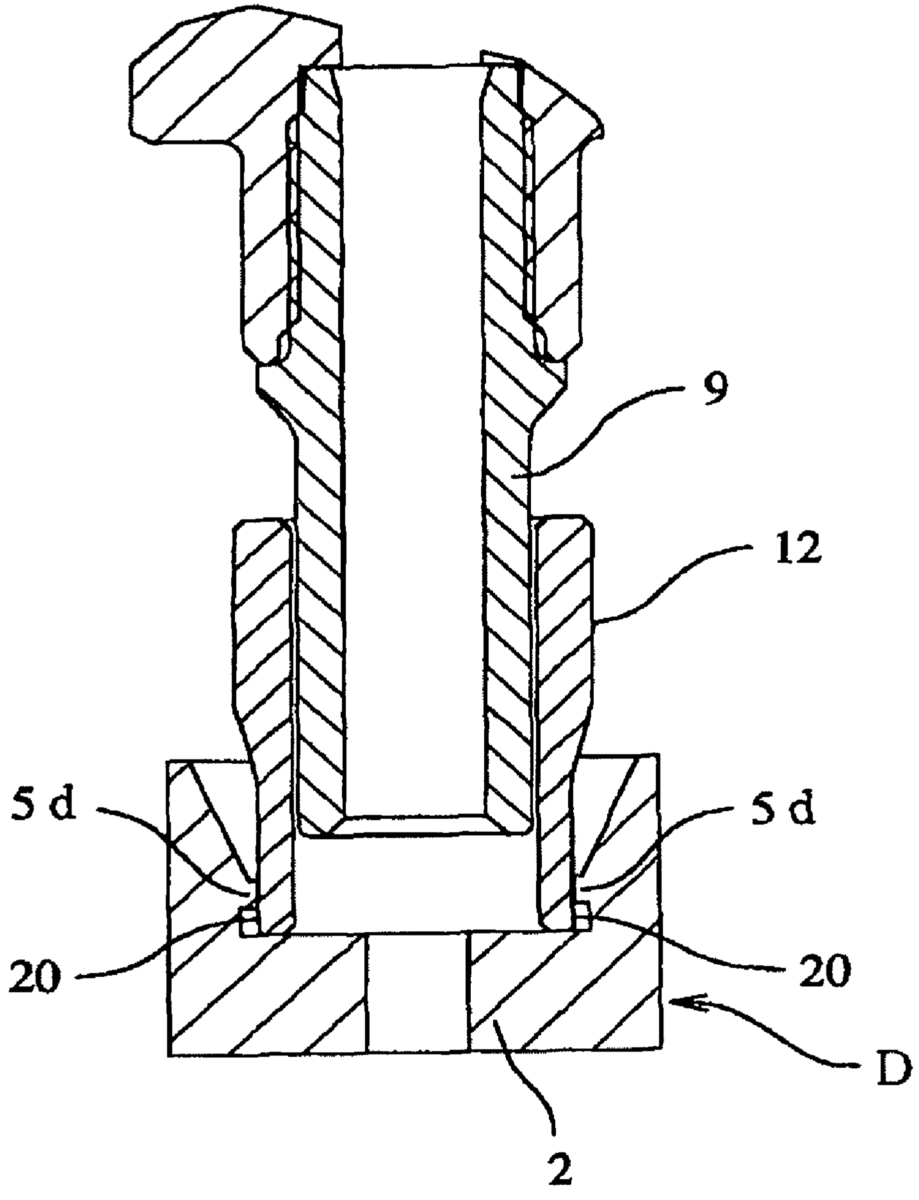
[FIG. 13(*a*)] A longitudinal section of the pushed state of the part clamp.
Figure 13B:
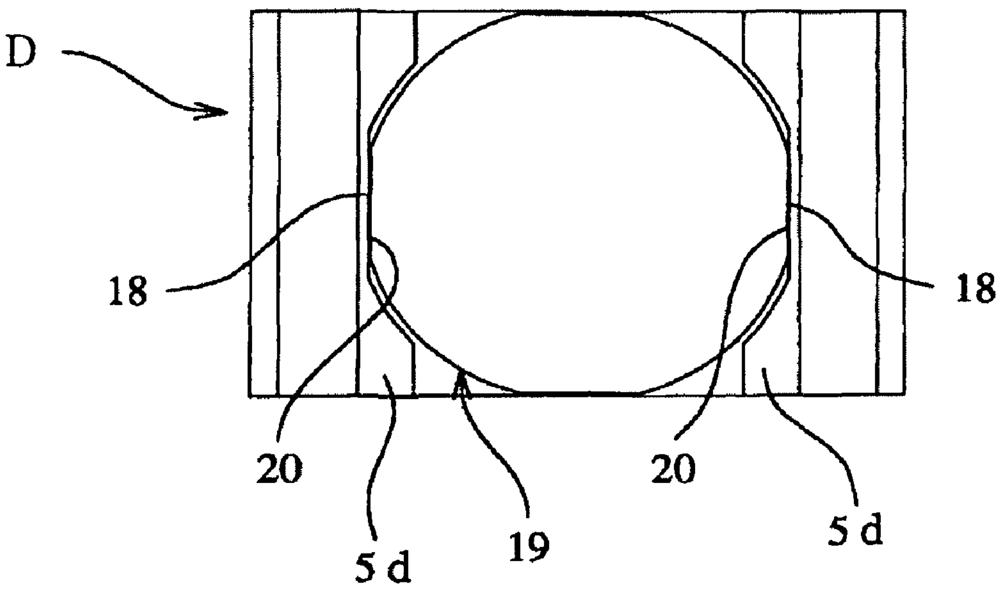
Figure 14A:
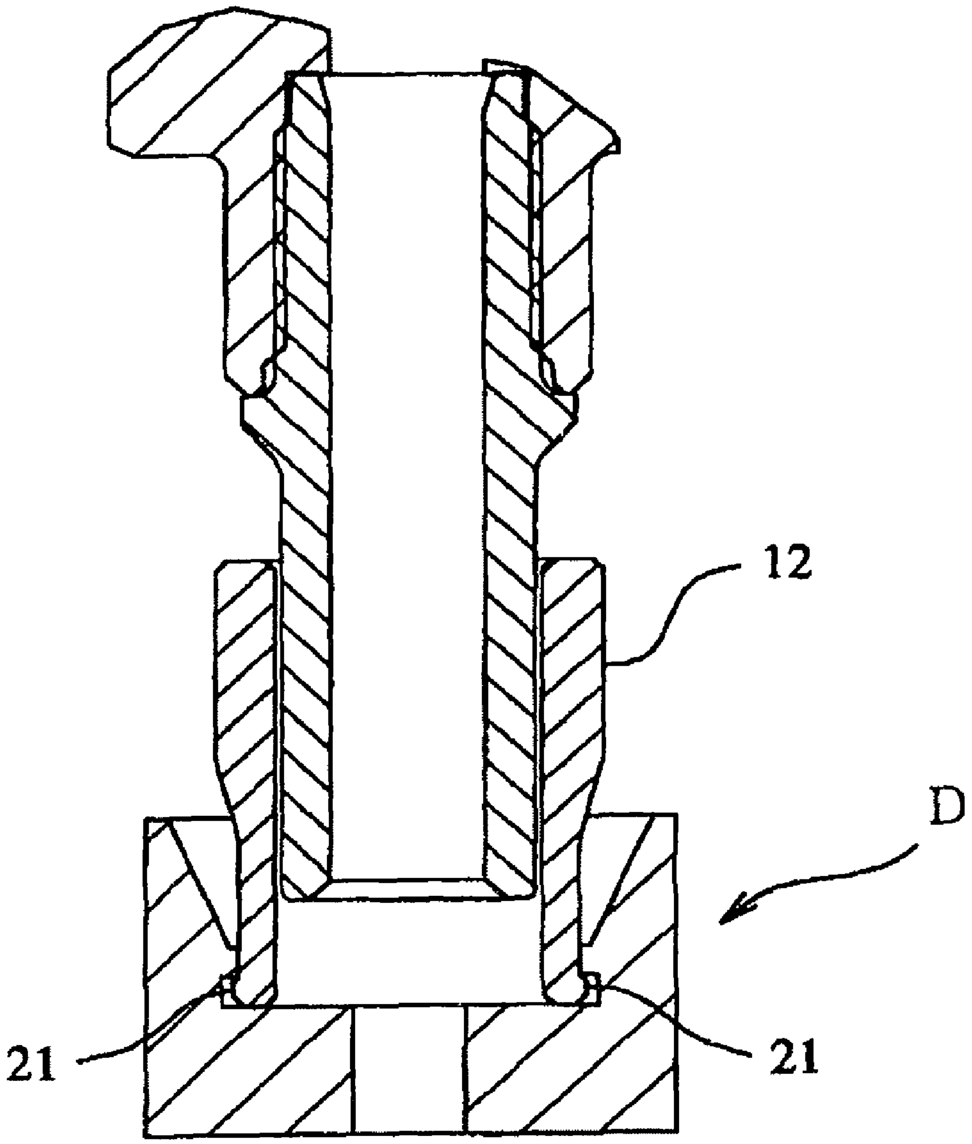
[FIG. 14(*a*)] A longitudinal section of the turned state of the part clamp.
Figure 14B:
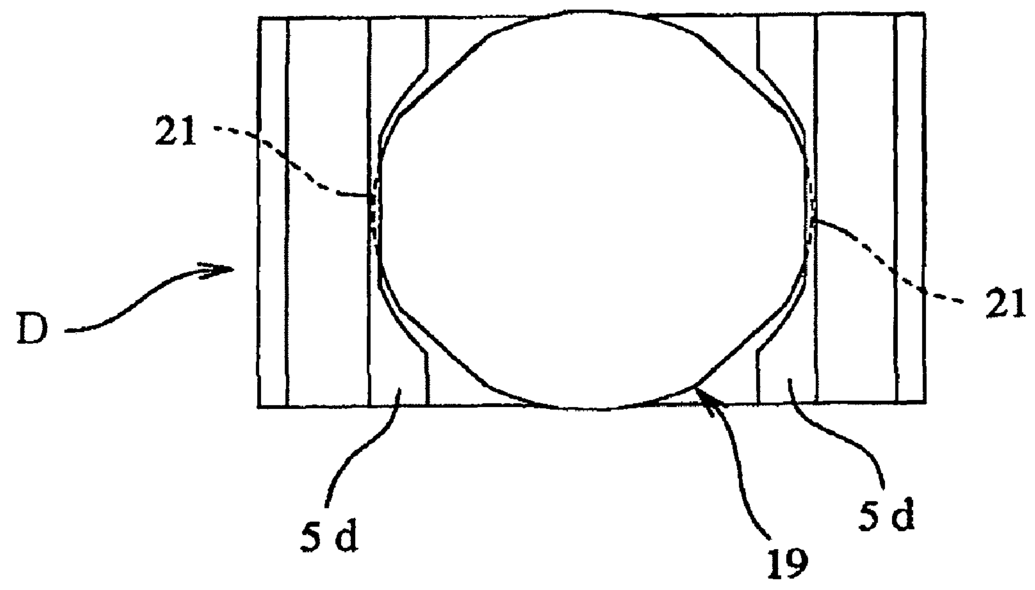
Figure 15:
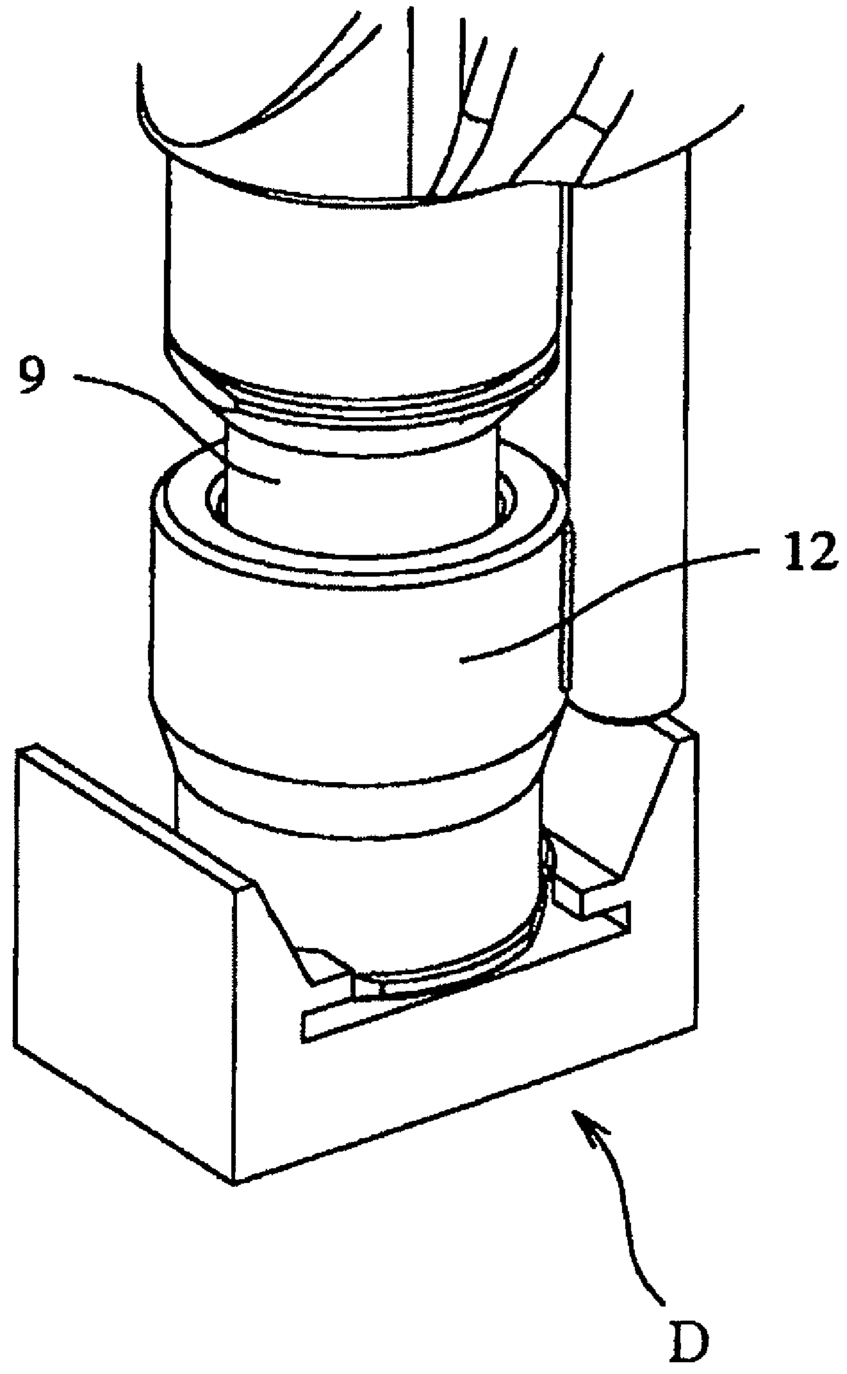
[FIG. 15] A perspective view of the temporary held state of the part clamp.

When the part clamp D is to be mounted on the short cylindrical portion 12 of the nailing machine, the part clamp D is pushed in the axial direction of the injection port 9 while being adjusted to the cut-away portions 20 at the leading end of the short cylindrical portion 12 and the arcuate portions 21 on the two sides of the former. Then, the leading end of the short cylindrical portion 12 is allowed to move to the base portion 2 so that the protrusion 19 moves to the back of the engaging portions 5, as shown in FIGS. 13(*a*) and 13(*b*). Moreover, the part clamp D is turned by 45 degrees so that the protrusion 19 is turned to engage with the back side of the center of the engaging portions 5*d*. In short, the part clamp D is brought into engagement with the short cylindrical portion 12 by moving the part clamp D in the axial direction of the injection port 9 till the leading end of the short cylindrical portion 12 and the base portion 2 come into contact, and then by turning the short cylindrical portion 12 and the part clamp D relative to each other.

In this case, too, the load to push the engaging portions 5*d* into engagement with the short cylindrical portion 12 is substantially equal to zero so that it is apparently smaller than the load necessary for pushing the short cylindrical portion 12 onto the root portion side of the injection port 9.

As a result, the short cylindrical portion 12 is not pushed when the part clamp D is brought into engagement with the short cylindrical portion 12, so that the safety device is not released. Moreover, the part clamp D can be moved axially of the injection port 9 and can also be mounted by a low load. Therefore, the part clamp D can be temporarily held simply and safely.

Here, the inner edge portions of the engaging portions 5*d* of the part clamp D need not always be shaped to combine the circle and the polygon, as described above. The inner edge portions may be a noncircular shape such as a polygonal or elliptical shape. Moreover, three or more rising portions 3 may be formed on the base portion 2.

<Embodiment 5>

Figure 16:
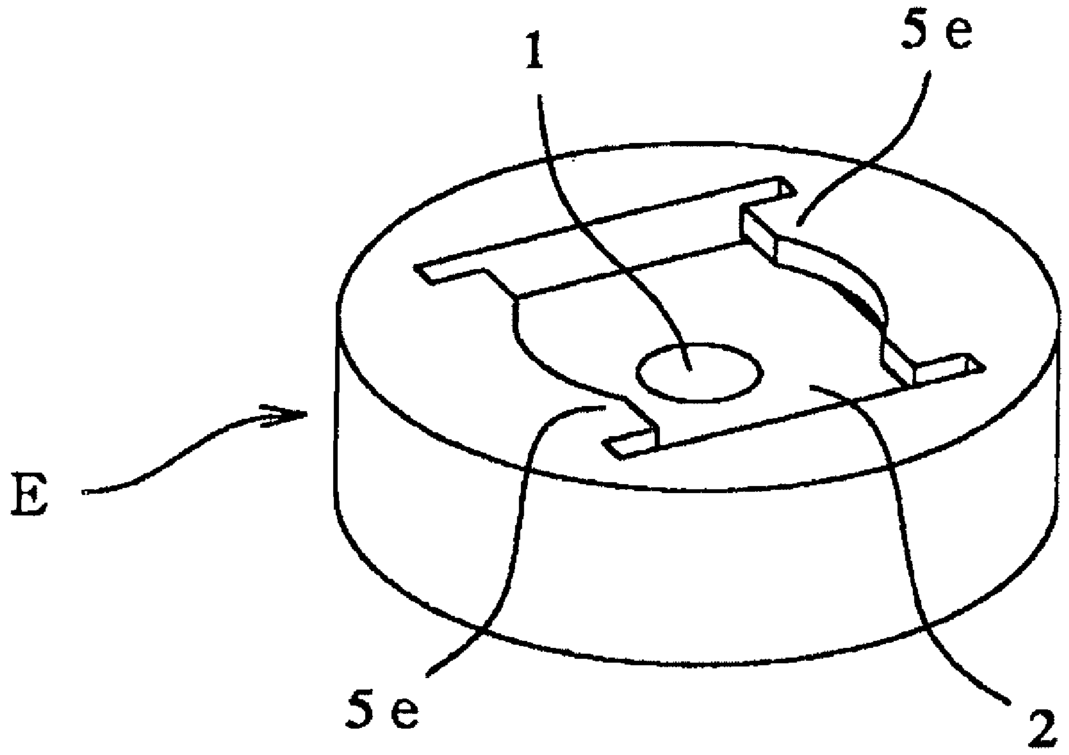
[FIG. 16] A perspective view of a further embodiment of the part clamp.

FIG. 16 shows a part clamp E of Embodiment 5 of the invention. The part clamp E is equipped with the base portion 2 having the through hole 1 for inserting a nail. The base portion 2 is formed into a disc shape, which has lip-shaped engaging portions 5*e* formed on the confronting sides of its circumference. The engaging portions 5*e* are formed such that they can engage with the leading end of the nailing machine when they move to the opposite side in the nailing direction.

Thus, the part clamp may also be constituted such that the engaging portions are directly formed in the base portion 2.

In case the part clamp E is temporarily held at the leading end of the nailing machine, the part clamp E may be so moved in the axial direction of the injection port of the nailing machine as to engage with the leading end of the injection port, as exemplified in Embodiment 1.

This case can also attain the same advantage as those of the foregoing embodiments. In FIG. 16, the engaging portions 5*e* are disposed by two in number, but three or more engaging portions 5*e* may also be disposed on the base portion 2.

<Embodiment 6>

Figure 17:
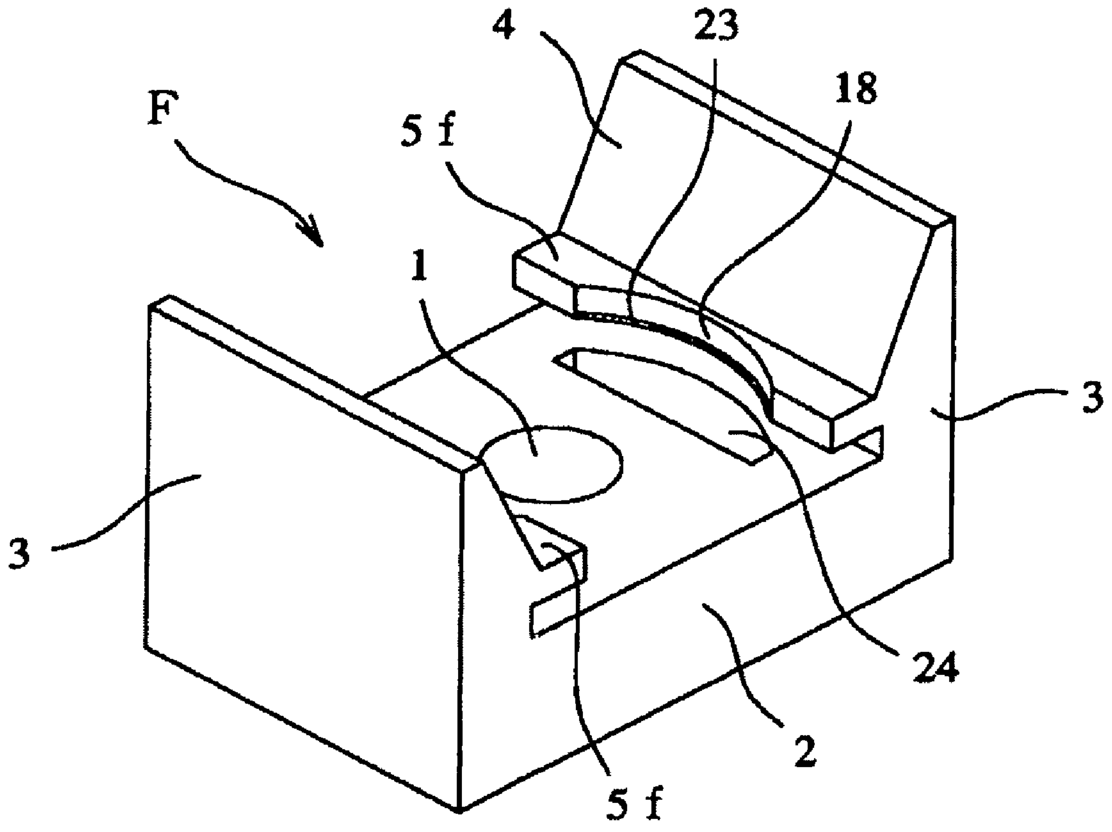
[FIG. 17] A perspective view of a further embodiment of the part clamp.

FIG. 17 shows a part clamp F of Embodiment 6 of the invention. The part clamp F is made of a synthetic resin and includes the base portion 2 and the rising portions 3. The sloped guide faces 4 are formed on the inner faces of the rising portions 3 on the two sides. On the inner sides of the root portions of the guide faces 4 on the two sides, there are formed engaging portions 5*f*. These engaging portions 5*f* are formed in a lip shape and have inner edge portions 18 notched in an arcuate shape. At the inner edge portions 18, moreover, there are formed ribs 23 having a triangular sectional shape (as referred to FIG. 17 and FIG. 19). Moreover, openings 25 are formed therethrough at corresponding positions below the inner edge portions 18 of the base portion 2.

Figure 18:
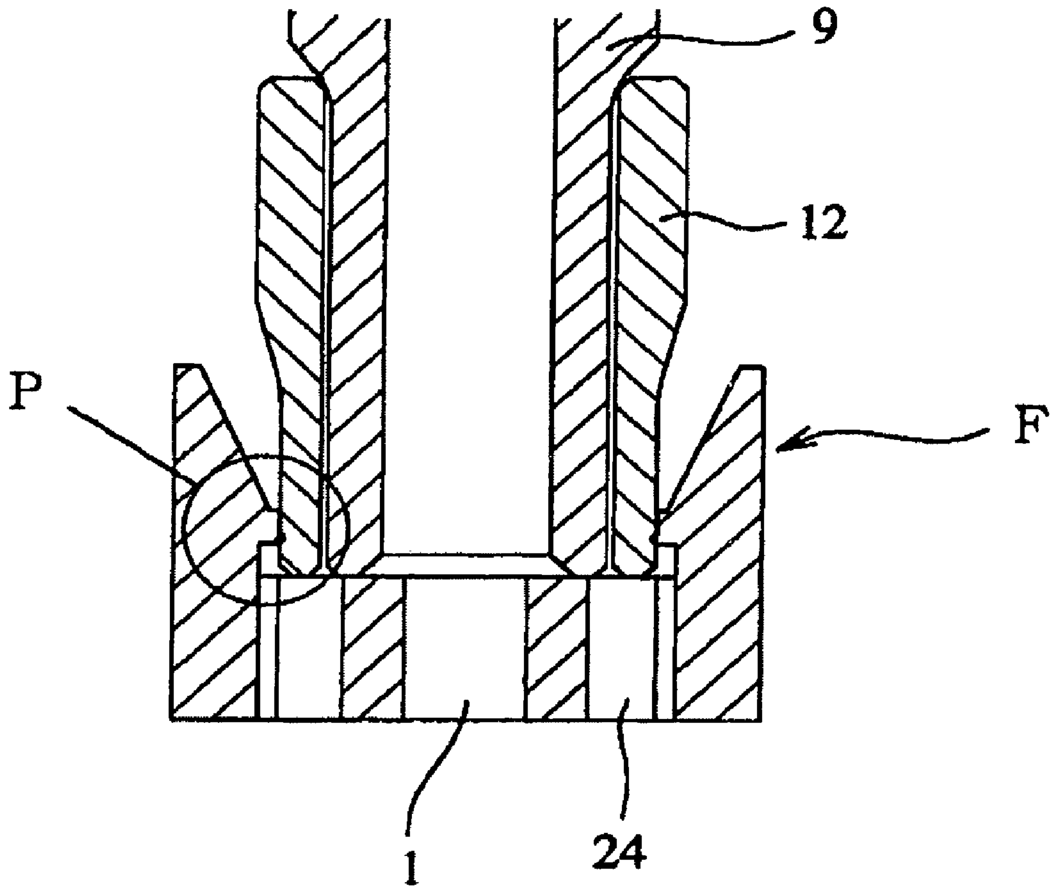
[FIG. 18] A longitudinal section of the temporary held state of the part clamp.

On the other hand, as shown in FIG. 18, the short cylindrical portion 12 of the nailing machine is formed into a straight cylindrical portion. Moreover, the short cylindrical portion 12 is chamfered at the outer circumference of its leading end to form a guide portion 25. Moreover, the short cylindrical portion 12 is formed to have an external diameter substantially equal to or slightly larger than the diameter of the inner edge portions 18.

Figure 19:
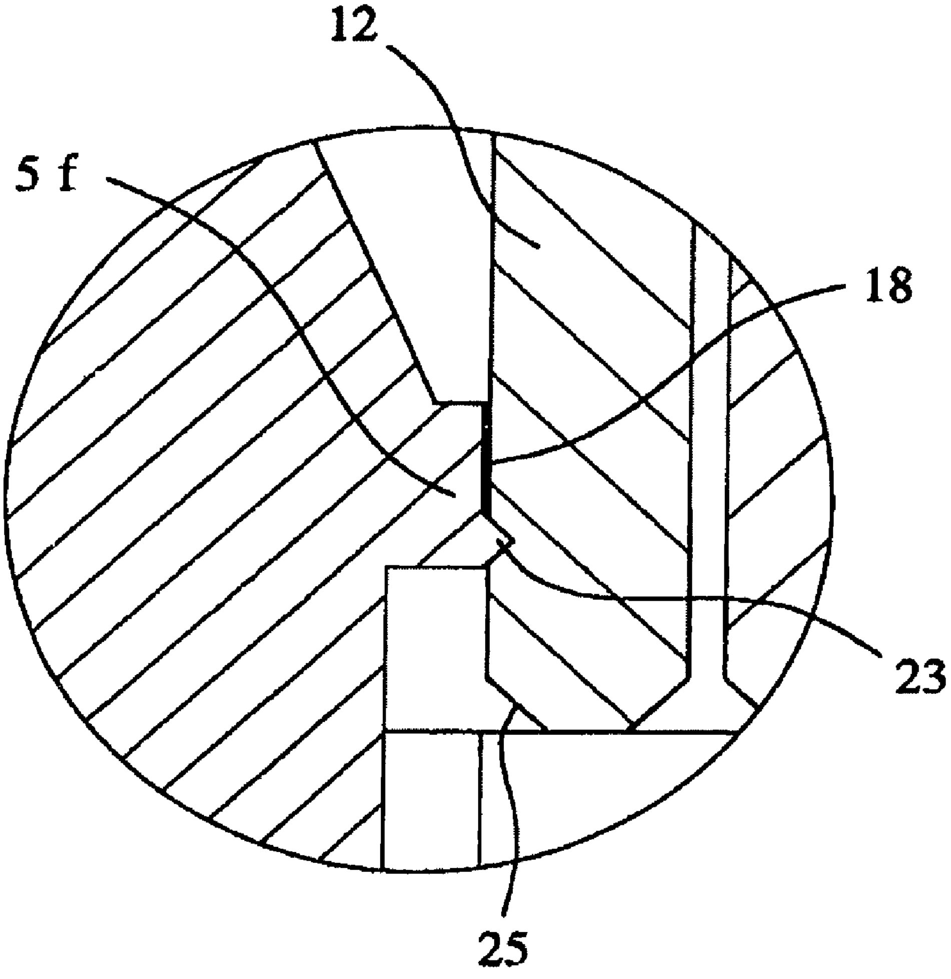
[FIG. 19] An enlarged view of a portion P of FIG. 18.

When the part clamp F is to be mounted on the short cylindrical portion 12, it may be pushed in the axial direction of the injection port 9 such that the leading end of the short cylindrical portion 12 is adjusted to the inner edge portions 18 of the engaging portions 5*f* of the part clamp F. The short cylindrical portion 12 is pushed from the leading end guide portion 25 into the inner edge portions 18 of the engaging portions 5*f*. At this time, the openings 24 are also deformed, and the pushing force may be low. Moreover, the ribs 23 of the inner edge portion 18 are pushed to bite into the outer face of the short cylindrical portion 12, as shown in FIG. 19, so that the part clamp F is temporarily held, without coming out, in the short cylindrical portion 12.

In this case, too, the load to push the engaging portions 5*f* into engagement with the short cylindrical portion 12 is lower than the load necessary for pushing the short cylindrical portion 12 onto the root portion side of the injection port 9. In other words, the load to push the part clamp F into engagement with the short cylindrical portion 12 is lower than that for pushing the contact arm 11 to slide along the injection port 9.

As a result, the short cylindrical portion 12 is not pushed when the part clamp F is brought into engagement with the short cylindrical portion 12, so that the safety device is not released. Moreover, the part clamp F can be moved axially of the injection port 9 and can also be mounted by a low load. Therefore, the part clamp F can be temporarily held simply and safely. Here in FIG. 17 and FIG. 18, the rising portions 3, the engaging portions 5*f* and the openings 24 are individually formed by two in number over the base portion 2, but three or more rising portions 3, engaging portions 5*f* and openings 24 may also be individually formed over the base portion 2.

Here, the various clip members to be fixed on the body wall face of the building are equipped with the part clamp A, A', B, B', C, C', D, E and F thus far described in detail, as disclosed in U.S. Pat. No. 4,291,855, so that they can be temporarily held at the leading end of the nailing machine. At this time, the part clamp A, A', B, B', C, C', D, E and F may be either constituted integrally with the clip members or assembled to the clip members.

The present invention has been described on the specific embodiments, but it is apparent to those skilled in the art that the invention can be modified or varied in various manners Without departing from spirit or scope thereof.

This application is based on Japanese Patent Application (P.2004-031025) filed on Feb. 6, 2004 and on Japanese Patent Application (P.2004-233793) filed on Aug. 10, 2004, the contents of which are incorporated herein by reference.

Industrial Applicability

According to the part clamp of the invention there is obtained an advantage that the engaging portions formed on the root side of the rising portions rising from the base portion can be brought in the axial direction of the injection port of the nailing machine into engagement with the leading end of the injection port.

According to the nailing machine of the invention, moreover, the load to push the engaging portions of the part clamp into engagement with the short cylindrical portion of the injection port of the nailing machine is lower than that necessary for pushing the short cylindrical portion 12contact arm 11 to the root side of the injection port. The nailing machine has an advantage that the part clamp can be temporarily held simply and safely.

The load to push the engaging portions of the part clamp into engagement with the short cylindrical portion of the contact arm of the nailing machine is lower than the load necessary for pushing the short cylindrical portion together with the contact arm onto the root portion side of the injection port. This constitution adopted realizes the mounting easiness of the part clamp without deteriorating the safety.

The invention claimed is:

1. A part clamp to be fixed by a nailing machine, comprising:

a base portion;

a through hole formed at a center of the base portion for inserting a nail thereinto;

a rising portion rising from the base portion, and the rising portion including a guide face inclined on an inner wall face of the rising portion; and an engaging portion being engageable with a leading end of a nailing machine, being formed in a lip shape, and having an inner edge portion formed in a noncircular shape, wherein the inner edge portion includes at least one straight portion and at least two curved portions, and the at least one straight portion is between the at least two curved portions.

* * * * *